Figure 1:
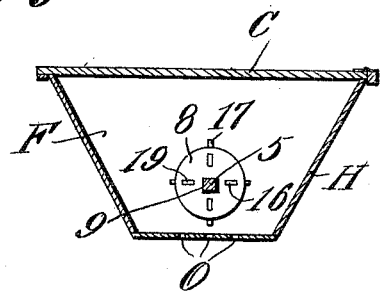

E. M. BICKERSTAFF.
FERTILIZER DISTRIBUTER.
APPLICATION FILED JULY 8, 1911.

1,005,767.

Patented Oct. 10, 1911.

E. M. Bickerstaff,
Inventor

Witnesses by C. A. Snow & Co.,
Attorneys

UNITED STATES PATENT OFFICE.

ELMER M. BICKERSTAFF, OF COCHRANTON, PENNSYLVANIA.

FERTILIZER-DISTRIBUTER.

1,005,767.  Specification of Letters Patent.  Patented Oct. 10, 1911.

Application filed July 8, 1911. Serial No. 637,558.

*To all whom it may concern:*

Be it known that I, ELMER M. BICKERSTAFF, a citizen of the United States, residing at Cochranton, in the county of Crawford and State of Pennsylvania, have invented a new and useful Fertilizer-Distributer, of which the following is a specification.

This invention relates to the class of devices known as seeders and planters, and more especially to the sub-class of machines therein known as fertilizer distributers; and the object of the same is to produce a machine of this kind embodying a hopper and having within its hopper and across the outlet openings thereof an agitator whose blades are adjustable toward or from said holes or outlets so as to accommodate the agitator to different kinds of fertilizer.
This object is accomplished by the construction described below and shown in the drawings wherein—

Figure 2:
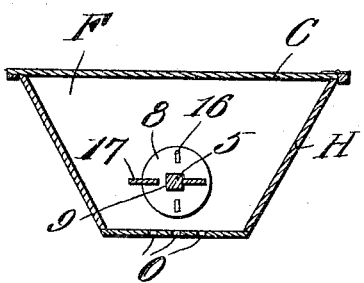
Figure 3:
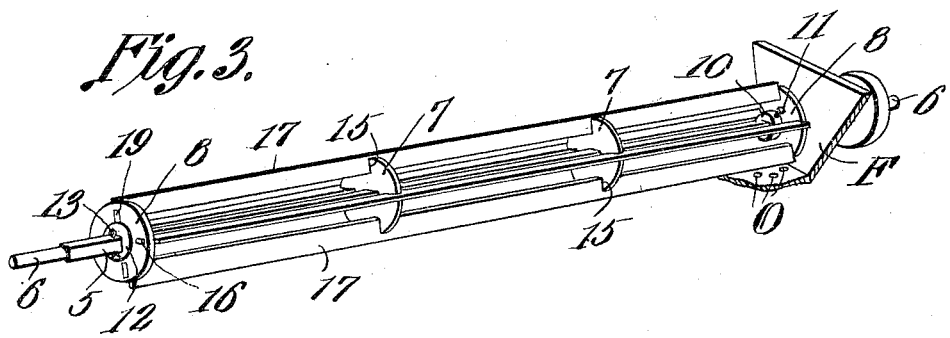
Figure 4:
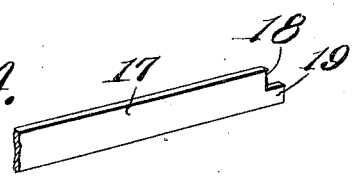
Figure 6:
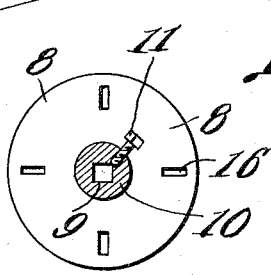
Figure 5:
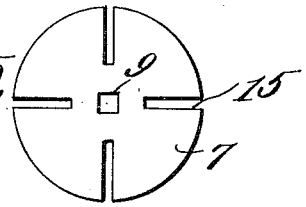

Figure 1 is an end elevation of the hopper of this machine with its nearmost end plate removed. Fig. 2 is a cross section through the hopper and its agitator about midway between the ends of the agitator showing a certain arrangement of two of the blades of the latter in a manner which will be described. Fig. 3 is a perspective detail of the agitator alone. Fig. 4 is a perspective detail of one of its blades. Figs. 5 and 6 are elevations of one of the intermediate and one of the extreme or end hubs of said agitator respectively.

In the drawings the letter H designates a hopper having a cover C, and through the bottom of the hopper are formed outlet openings O as usual. This hopper, it is to be understood, is of about the cross sectional proportions shown, but is of considerable length transversely to the line of draft; and is usually mounted on wheels and drawn by a horse across the field in which the fertilizer is to be sown. Of course I do not mean to be limited to the sowing of fertilizer, for this machine might be used to sow seed, and in fact the invention might be employed in hoppers of a vast variety of constructions differing from that illustrated herein which is merely typical and is used for purposes of illustration.

It will not be necessary to go into more detail as to the specific construction or the uses of the machine, but it is well known to those who have worked with them that the fertilizer is apt to clog therein according to what fertilizer is used and to the weather conditions, and some agitator is often necessary in order to break up such clogging and cause the material—whatever it is and whatever the climatic conditions—to deliver freely and constantly through the outlet openings in the hopper. This agitator is the subject matter of the present invention and here again it will be unnecessary to illustrate the means for rotating it within the hopper as the machine is drawn over the ground.

Coming now more particularly to the present invention, the numeral 5 designates an angular shaft, preferably square, having rounded extremities 6 which are suitably journaled in the ends F of the hopper H in a manner not necessary to show, and to one of which power is applied in a manner also not illustrated herein. Slidably mounted on the shaft are disks whereof those standing intermediate its extremities are numbered 7 and the extreme disks are numbered 8, and if the shaft is square as shown the holes or openings 9 through the disks will be square, although of course the shaft might be made of other angular configuration or might be round with a groove in it and these openings 9 might be round and each have a feather to engage the groove— all of which details are well known in mechanical arts. The intermediate disks 7 need have no hubs, although they may have if preferred; but the endmost disks 8 by preference do have hubs as shown at 10, and through each hub is passed some fastening device such as a set screw 11 as shown in Fig. 6. If even these end disks 8 do not have hubs, a washer 12 may be substituted as seen at the left of Fig. 3, and the fastening device may take the shape of a pin 13 extending through the shaft 5 outside the washer. These illustrations and this description are merely typical, but I may adopt almost any means for permitting the longitudinal movement of the endmost disks 8 on the shaft, while requiring them to rotate therewith, although I prefer the use of such fastening devices as may be readily reached and manipulated from the top of the hopper H when its cover C is open, and without disturbing the shaft or its bearings or its operating mechanism and with the least disturbance possible to the various disks.

Each intermediate disk is provided with radial slots 15 as seen in Fig. 5, and each endmost disk is provided with openings 16 preferably rectangular and elongated in radial directions from its axis; and if the shaft 5 be square there preferably will be four slots 15 in each intermediate disk and four openings 16 in each endmost disk, all disposed equidistant from each other.

In Fig. 4 is shown one of the blades 17, of which there are four by preference, and each may well be a strip of metal or wood of slightly less thickness than the width of said slots 15 and openings 16 and of a width edgewise which is about twice the greatest length of the opening 16. In length each blade is equal to that of the length of the agitator, as seen in Fig. 3. Each end of the blade is cut away as at 18 at one edge so as to leave a tongue 19 projecting from the other edge, and this tongue is of a size to accurately fit any one of said openings 16.

The agitator thus described is set up as follows: The intermediate disks are strung upon the shaft (and they may be more in number or less than shown in the drawings, or in fact with an extremely short hopper they might be omitted) after which the endmost disks are slipped onto this shaft from its extremities. Each blade is then placed in position, its edge being passed into the slots 15 of the intermediate disks and its tongues 19 being engaged with the openings 16 of the endmost disks. As shown in Fig. 3 and at the left of Fig. 2 the tongues stand adjacent the shaft so that the bodies of the blades extend a little beyond the periphery of the disks, and this is the manner of mounting the blades when their outer edges are to pass close across the bottom of the hopper and across its outlet openings. At the right of Fig. 2 is shown a blade whose inner edge rests against the shaft 5 so that its outer edge stands flush with or even a little within the contour of the disks, and this position of the blades may be effected by reversing them so that their tongues 19, while yet standing in the openings, are at the outer edges instead of at the inner edges of the blades whose bodies therefore project inwardly and will contact with the shaft if they are wide enough. Obviously the slots 15 in the intermediate disks permits the ready removal of the blades for inversion and their quick reinsertion after they have been turned over. But the use of fastening devices on the endmost disks, either with or without the hubs, will now be apparent; because it is obvious that in order to invert or reverse the blades edge for edge, at least one of the endmost disks must be loosened on and slipped outwardly along the shaft 5. This of course is accomplished by loosening the fastening device whether it be outside or inside the disk and whatever its construction, and then this disk may be moved outwardly and the extremities or tongues 19 at that end of all the blades disconnected from the openings 16, after which the blades can of course be taken out and reversed and reinserted, and finally the disk restored to its position and reattached to the shaft. This is done and the blades so set when the material being sown is coarser or not caked, or when its disposition is regulated by the size of the outlet openings O in the hopper H.

Thus it will be seen that I have produced an agitator for a hopper which is extremely simple in construction and yet permits of the removal and inversion of the blades so as to cause them to travel nearer to or more remote from the outlet openings in the hopper. It will be clear without further illustration that when the blades are removed, other of different shape and width and size may be substituted without departing from the spirit of my invention. Also I desired to call attention to the fact that by simply lifting the hopper cover C access can be gained to one or both of the fastening devices, whether they be set screws 11, cotter pins 13, or any other simple means for engaging the endmost disks 8 or their hubs 10 with the shaft 5; and therefore the latter need not be taken out of its bearings nor its driving mechanism disconnected, and in fact no part of the entire machine need be disturbed in order to effect the reversal of the position of the blades 17 or a substitution of other blades for those which are now in place and as shown in the drawings. Merely forming the tongues 19 toward one edge of the blade and cutting away the other edge as shown at 18, permits a blade made of an ordinary slat of wood to be reversed, and in the great majority of cases this will doubtless be sufficient for the ordinary machine.

What is claimed is:—

1. A hopper agitator comprising a square shaft extending throughout the length of the hopper and means for rotating said shaft, disks mounted thereon for rotation therewith said disks having rectangular openings disposed around their centers and radial to them on the line of the length of the openings, other disks mounted on said shaft between those first mentioned and having radial slots corresponding in position with the openings and each slot opening out the edge of the disk, and a series of blades each consisting of a strip of a thickness to enter said openings and slots and cut away at one edge at each end so as to leave a projecting tongue at the other edge which is of a size to engage one of said openings whether the body of the blade projects inward or outward therefrom.

2. A hopper having outlet openings in its bottom, inclined sides, a hinged cover, and upright ends; combined with an agitator comprising a square shaft extending throughout the length of the hopper and having rounded extremities journaled in the ends thereof, means for rotating said shaft, disks mounted thereon for rotation therewith, hubs on said disks, fastening devices, removably attaching the hubs of the disks to said shaft, said disks having rectangular openings disposed around their centers and radial to them on the line of the length of the openings, and a series of blades each consisting of a strip of thickness to enter said openings and slots and cut away at one edge at each end so as to leave a projecting tongue at the other edge which is of a size to engage one of said openings whether the body of the blade projects inward or outward therefrom.

3. A hopper having outlet openings in its bottom, inclined sides, a hinged cover, and upright ends; combined with an agitator comprising a shaft extending throughout the length of the hopper and journaled in the ends thereof, means for rotating said shaft, disks mounted thereon for rotation therewith but adjustable longitudinally, said disks having rectangular openings disposed around their centers and radial to them on the line of the length of the openings, other disks mounted on said shaft between those first mentioned and having radial slots corresponding in position with the openings and each slot opening out the edge of the disk, and a series of blades each consisting of a strip of a thickness to enter said openings and slots and cut away at one edge at each end so as to leave a projecting tongue at the other edge which is of a size to engage one of said openings whether the body of the blade projects inward or outward therefrom.

4. A hopper having outlet openings in its bottom, inclined sides, a hinged cover, and upright ends; combined with an agitator comprising a shaft extending throughout the length of the hopper and having rounded extremities journaled in the ends thereof, means for rotating said shaft, disks mounted thereon for rotation therewith, hubs on said disks, set screws removably attaching the hubs of the disks to said shaft, said disks having rectangular openings disposed around their centers and radial to them on the line of the length of the openings, other disks mounted on said shaft between those first mentioned and having radial slots corresponding in position with the openings and each slot opening out the edge of the disk, and a series of blades each consisting of a strip of a thickness to enter said openings and slots and cut away at one edge at each end so as to leave a projecting tongue at the other edge which is of a size to engage one of said openings whether the body of the blade projects inward or outward therefrom.

In testimony that I claim the foregoing as my own, I have hereto affixed my signature in the presence of two witnesses.

ELMER M. BICKERSTAFF.

Witnesses:
 JNO. GURNSEY,
 F. A. CURTIS.

---

Copies of this patent may be obtained for five cents each, by addressing the "Commissioner of Patents, Washington, D. C."